(12) United States Patent
Fujioka

(10) Patent No.: US 8,533,610 B2
(45) Date of Patent: Sep. 10, 2013

(54) WIDGETIZED AVATAR AND A METHOD AND SYSTEM OF CREATING AND USING SAME

(75) Inventor: Robb Fujioka, Manhattan Beach, CA (US)

(73) Assignee: Fuhu Holdings, Inc., El Segundo, CA (US)

( * ) Notice: Subject to any disclaimer, the term of this patent is extended or adjusted under 35 U.S.C. 154(b) by 379 days.

(21) Appl. No.: 12/592,207

(22) Filed: Nov. 20, 2009

(65) Prior Publication Data

US 2010/0077315 A1 Mar. 25, 2010

Related U.S. Application Data

(63) Continuation of application No. 12/381,663, filed on Mar. 13, 2009.

(60) Provisional application No. 61/069,336, filed on Mar. 13, 2008.

(51) Int. Cl.
*G06F 3/14* (2006.01)

(52) U.S. Cl.
USPC ............ 715/757; 715/706; 715/850; 707/10; 235/376; 235/383

(58) Field of Classification Search
USPC ......... 715/200–277, 700–867; 700/701–866; 709/201–229; 705/50–79; 345/30–111; 707/10, 200–206; 235/376, 383

See application file for complete search history.

(56) References Cited

U.S. PATENT DOCUMENTS

| | | | |
|---|---|---|---|
| 7,918,388 B2* | 4/2011 | Abecassis et al. | 235/376 |
| 2005/0248574 A1 | 11/2005 | Ashtekar et al. | |
| 2006/0294465 A1 | 12/2006 | Ronen et al. | |
| 2007/0113181 A1* | 5/2007 | Blattner et al. | 715/706 |
| 2007/0168357 A1* | 7/2007 | Mo | 707/10 |
| 2007/0219794 A1 | 9/2007 | Park et al. | |
| 2007/0273711 A1 | 11/2007 | Maffei | |
| 2009/0064052 A1* | 3/2009 | Mihalcheon | 715/850 |
| 2009/0144639 A1* | 6/2009 | Nims et al. | 715/757 |
| 2009/0152349 A1* | 6/2009 | Bonev et al. | 235/383 |

* cited by examiner

*Primary Examiner* — Ruay Ho
(74) *Attorney, Agent, or Firm* — Marc E. Hankin; Kevin Schraven; Jimmy Sauz

(57) ABSTRACT

The invention is a method of creating and using an avatar or virtual representation of a user. The avatar is portable and widgetized such that it may be accessed from at least two different webpages. Additionally, the avatar is customizable and is able to virtually shop in a virtual shopping environment. The virtual shopping environment presents items to purchase that are related to the personal information of the avatar's user.

14 Claims, 5 Drawing Sheets

WIDGETIZED AVATAR AND A METHOD AND SYSTEM OF CREATING AND USING SAME

RELATED APPLICATIONS

This application is a continuation of U.S. patent application Ser. No. 12/381,663, titled "A Widgetized Avatar and a Method and System of Creating and Using Same.," filed Mar. 13, 2009, the entirety of which is incorporated herein as if set forth in its entirety. This application claims priority to U.S. Proyisional Patent Application No. 61/069,336, titled "Widgetized avatar and a Method and system of creating and using same." filed Mar. 13, 2008, the contents of which are expressly incorporated herein by this reference as though set forth in their entirety, and to which priority is claimed.

FIELD OF THE INVENTION

The present, invention is directed to avatars for use in computing communities and, more particularly, to a widgetized avatar and a method and system of creating and using same.

BACKGROUND OF THE INVENTION

Many computing and entertainment embodiments allow for a user, player, or viewer to create an "avatar." An avatar is typically a virtual manifestation of that user's "computerized physicality." However, the prior art typically provides only limited options for a user who wishes to create an avatar, such as limited physical features, clothing, associated information, and the like. As such, a typical avatar allows for only very limited information about a user to be relayed by the avatar. More specifically, the physical characteristics of the avatar likely have only limited applicability to the physicality of the real-world user, due in part to the limited physical, clothing and the like options available in creating the avatar, and the typical information associated with the avatar, other than its physicality, is limited or non-existent.

Additionally, present avatars need to be created over and over again, and are highly variable for the same real user as between different applications using an avatar, in principal part because avatars are not typically transferable as between multiple applications. Further, present avatars present little or no monetization or marketing opportunities, nor do present avatars allow for collection of or provision to, potential transaction partners of the preferences, characteristics or interests of the actual user.

Thus, the need exists for an avatar, and an apparatus, system and method related thereto, that allows for transferability, improved physical relation to the actual user, more information regarding the actual user, and improved marketing, monetization and transaction opportunities related to the user's avatar.

SUMMARY OF THE INVENTION

An avatar is disclosed. The avatar includes computing code that provides for addition of the avatar as non-static content to at least two unique at least partially static web pages, and secondary computing code resident within the computing code, wherein the secondary computing code provides for association with at least one other portion of the computing code of: ones selected from a plurality of physical characteristics, ones selected from a plurality of clothes, ones selected from a plurality of accessories, a plurality of personal information, a plurality of preferences, and a plurality of recommendations.

A system for creating an online persona, including a widgetized avatar, and recommending content for viewing by a user of the online persona is also disclosed. The system includes computing code that provides for addition of the avatar as non-static content to at least two unique at least partially static web pages, secondary computing code resident within the computing code, wherein the secondary computing code provides for association with at least one other portion of the computing code of: ones selected from a plurality of physical characteristics, ones selected from a plurality of clothes, ones selected from a plurality of accessories, a plurality of personal information, a plurality of preferences, and a plurality of recommendations, and, a recommendation engine employing suitable to suggest content based on at least one of a user's community, popularity, known expertise, clicks, interests, and searches.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical avatar and computing apparatuses, systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

An avatar is understood by one of ordinary skill in the art to include a computer user's representation of him or herself, such as in the form of a two or three dimensional model used in computer games, social network applications, or other on-line communities. A typical avatar may further include, or have associated therewith, a user's name, a user's screen name, a handle, or text of interest, such as a trademark, saying, or poem, for example.

A widget in accordance with the present invention, and as will be understood by one of ordinary skill in the art, is a portable portion of code that may be installed or executed within any separate HTML based, webpage by an end user without necessitating additional compilation of that code portion. Such widget code portions, in accordance with the present invention, are embeddable by the end user. As such, a widget in accordance with the present invention is any code portion that may be embedded by the end user within a selected page of HTML, XML, or like code that causes presentation of that selected web page. The widget, via the embedded code portion, thereby adds non-static content to the subject webpage.

Figure 1:
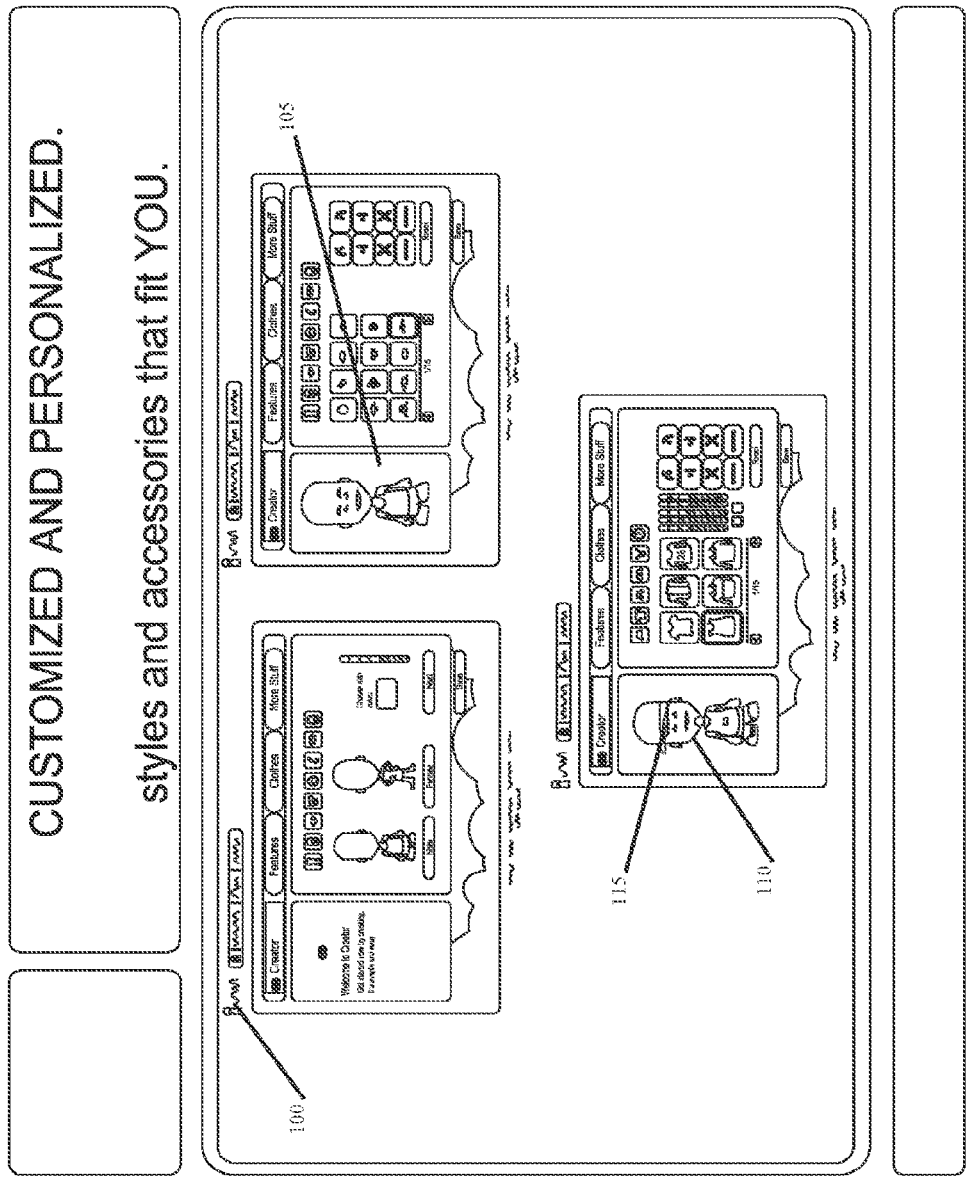
FIG. 1 illustrates an avatar in accordance with the present invention.
Figure 2:
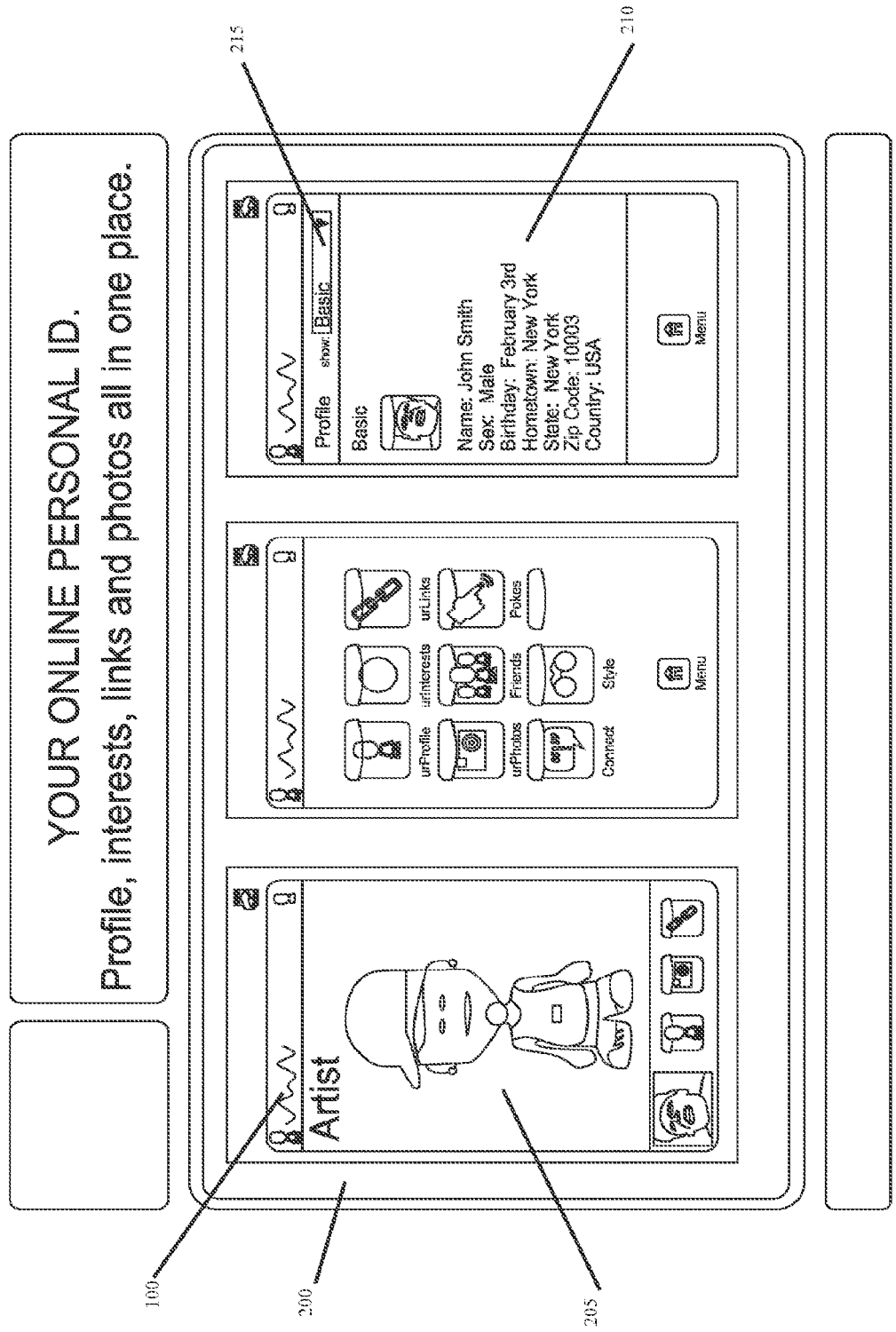
FIG. 2 illustrates an avatar in accordance with the present invention.

The present invention includes a fully portable, widgetized avatar having associated therewith multiple items of social information that are generally requested for association with at least two different computing communities or transactions. Widgetization of the avatar of the present invention necessarily allows for portability of the avatar of the present invention. For example, creation of a typical avatar 105 in accordance with the present invention may include the association of physical features, such as facial 110 and hair 115, with the subject avatar, as well as the aforementioned user name 100, as shown in FIG. 1. Further, a myriad of additional information may be associated with the avatar, wherein such information is generally required or desired for use in computing communities or transactions. This information may be organized into multiple levels of detail, and/or multiple levels of accessibility to third parties in a computing community or transaction. Such levels of accessibility may be selected by the creator of the widgetized avatar based on characteristics of the third party endeavoring to access the subject avatar. For example, a user may have basic information 210, which may be selectable for viewing by all registered users of a particular community, as shown in FIG. 2.

In an exemplary embodiment, a user may have likes or dislikes, such as musical or motion picture tastes, job or educational status, age, location, income, marital status, and other computed communities with which that user is associated, associated with his or her avatar. The present invention provides a physical manifestation of all of this information, such as in a "trading card" format 200. For example, FIG. 2 illustrates an avatar 205 wherein the front of the virtual trading card includes an avatar having particular physical features, clothing, accessories, activities, and the like, along with an associated user name 100. However, when an interaction, such as selection of a drop-down menu 215, selection of a link, a double click, or the like is undertaken to "flip" a trading card to the back, a myriad of additional information, such as a basic user profile 210, is displayed regarding the user related to the widgetized avatar, such as age, interests, likes and dislikes, employment status, and the like.

Needless to say, because the virtual manifestation of the physical trading card is embodied in the computing code that provides for the virtual manifestation, such computing code may be provided in such a normalized format that it is easily adopted into multiple computing communities or environments, and/or may be adopted as non-static content onto multiple different web pages. As such, the subject avatar may be incorporated into multiple social communities, fantasy sports communities, blogs, and the like. Further, avatars of particular interest to the general public, such as trading card avatars of musical artists or other famous persons, may be downloaded or referenced by fans of such famous persons. Such avatars may, in fact, be presented in non-classical formats, such as through a tab presentation on a web page designed by the user as a home page in a certain community, or that is set forth by a particular computing community. Such "celebrity" avatars, including in such non-classical formats, may include presentations or allow for interactions with celebrity suggestions or favorites, such as recipes, music, concerts, movies, talk shows, reality shows, or the like, and may further allow for purchases from or related to such suggestions or favorites.

Figure 3:
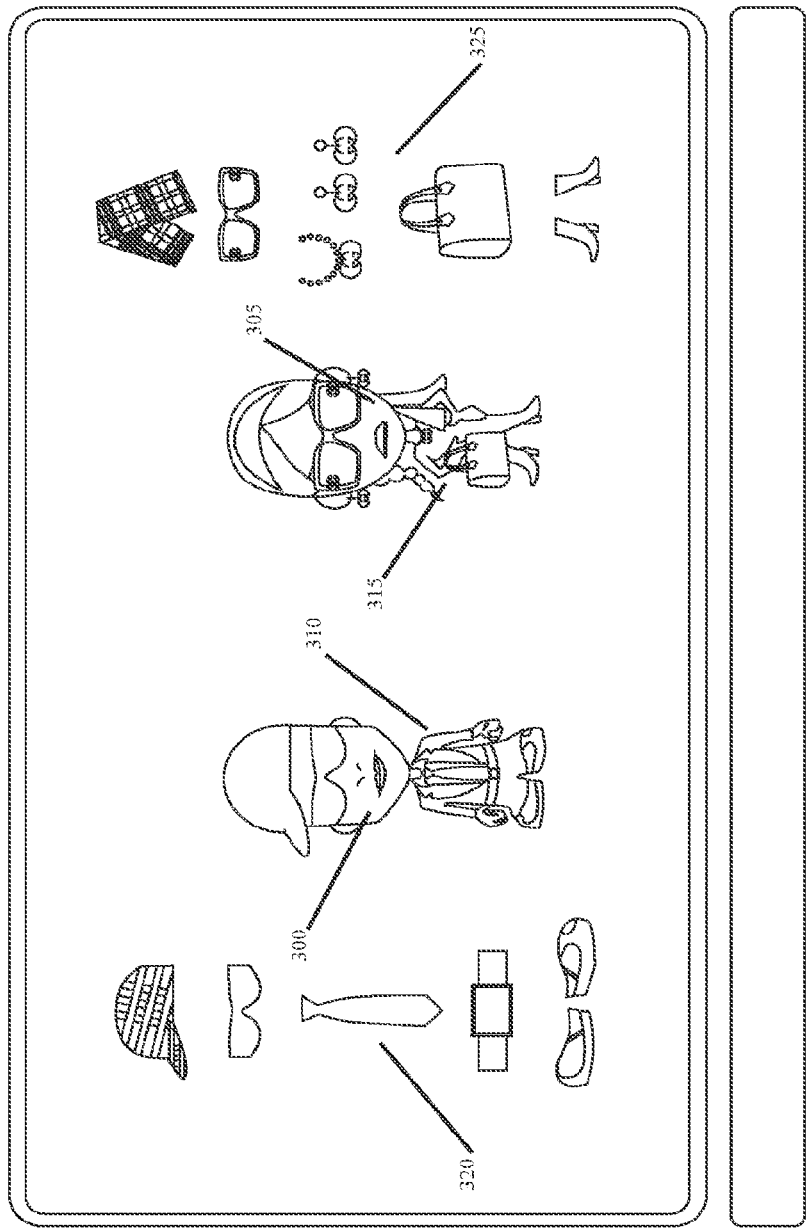
FIG. 3 illustrates an avatar in accordance with the present invention.
Figure 4:
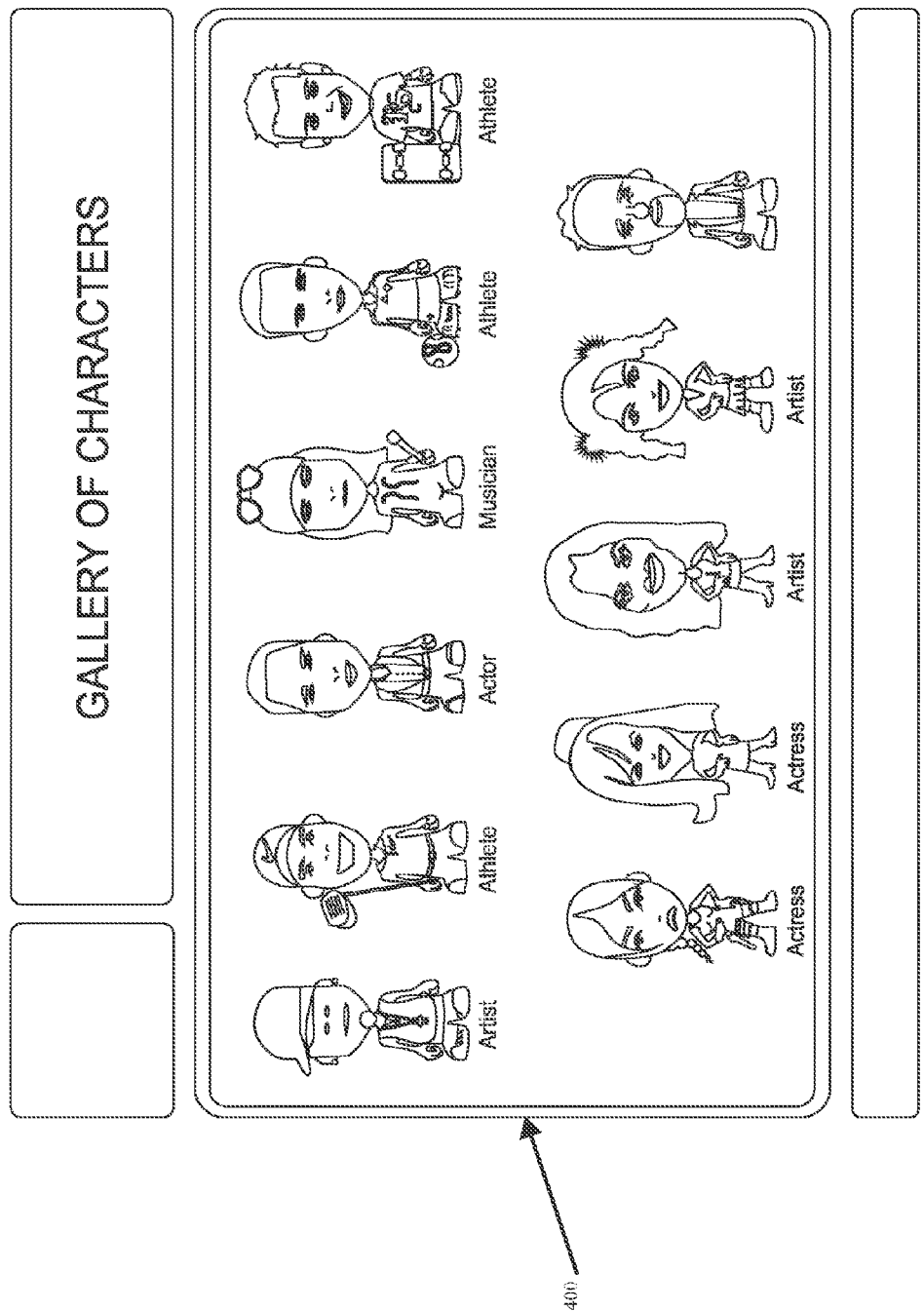
FIG. 4 illustrates a plurality of avatars in accordance with the present invention.

As referenced hereinabove, a typical avatar may have associated therewith certain physical features 300, 305; clothing 310, 315; accessories 320, 325 or activities, for example. As such, the present invention is and includes a tool whereby such physical features 300, 305; clothing 310, 315; accessories 320, 325; and activities may be taken from the real world and "virtualized," for use with a subject avatar, as shown in FIG. 3. For example, famous clothing lines, such as Vera Wang clothing, or famous shoe lines, such as Nike sneakers, or famous accessories, such as Kate Spade purses, or well known activities, such as playing for the Philadelphia Phillies, and goods at well known retailers, such as Tiffany's, Macy's, or the like, may be virtualized for use with an avatar. As such, virtualized items may be made available for sale for use with an avatar just as the corresponding real items are generally for sale for use with the real world user correspondent to the avatar. Likewise, celebrity avatars may be presented as "model" widgetized avatars 400, and the user may be enabled to purchase those items worn by the celebrity's avatar, and/or that are endorsed by that celebrity, as shown in FIG. 4.

Thereby, for example, during or following creation of a discreet widgetized avatar and/or a widgetized avatar to be associated with the aforementioned avatar trading card, the user creating the avatar may have available a selectable library of options for association with the subject avatar, such as a searchable library of options searchable by key word, or a hierarchal library of options presented by topic. Such libraries may be presented as "stores," for example, in which the avatar may "shop." For example, for "fashion", a user may enter a fashion "shopping" environment, such as a virtual "mall," to be presented with available virtual clothing lines for the avatar. Such lines may be visually presented by piece of clothing, or pieces of clothing on a shelf, for example, as would be the case in a real-world shopping for the real world user correspondent of the avatar. For example, for "shirts", the user may be presented with options such as Jones New York, Tommy Hilfiger, Fubu, Major League Baseball, National Football League, and the like, and such options may be presented as storefronts, for example. The user may then select one of the presented fashion shopping points for shirts, and then may be presented with the entire line of "real world" shirts associated with that fashion line, but, of course in a virtualized format. Thus, for example, upon selection of a Major League Baseball store, the user may be presented with a series of major league baseball team jerseys for association with that user's avatar. Needless to say, the user may then select the baseball jersey of that user's favorite team, and may in fact pay, such as through the use of a micropayment, for the use of that virtual jersey just as the user might pay for the purchase of a real world jersey of that user's favorite baseball team in a real world store. Similarly, lines of pants, dresses, suits, shoes, and the like may be made available for use with avatars, and may in fact be made available for purchase by users for use with avatars. Likewise, accessories or activities that would require purchase in the real world by the user may additionally allow for purchase of such accessories or activities in the virtual world for use with the user's widgetized avatar.

Figure 5:
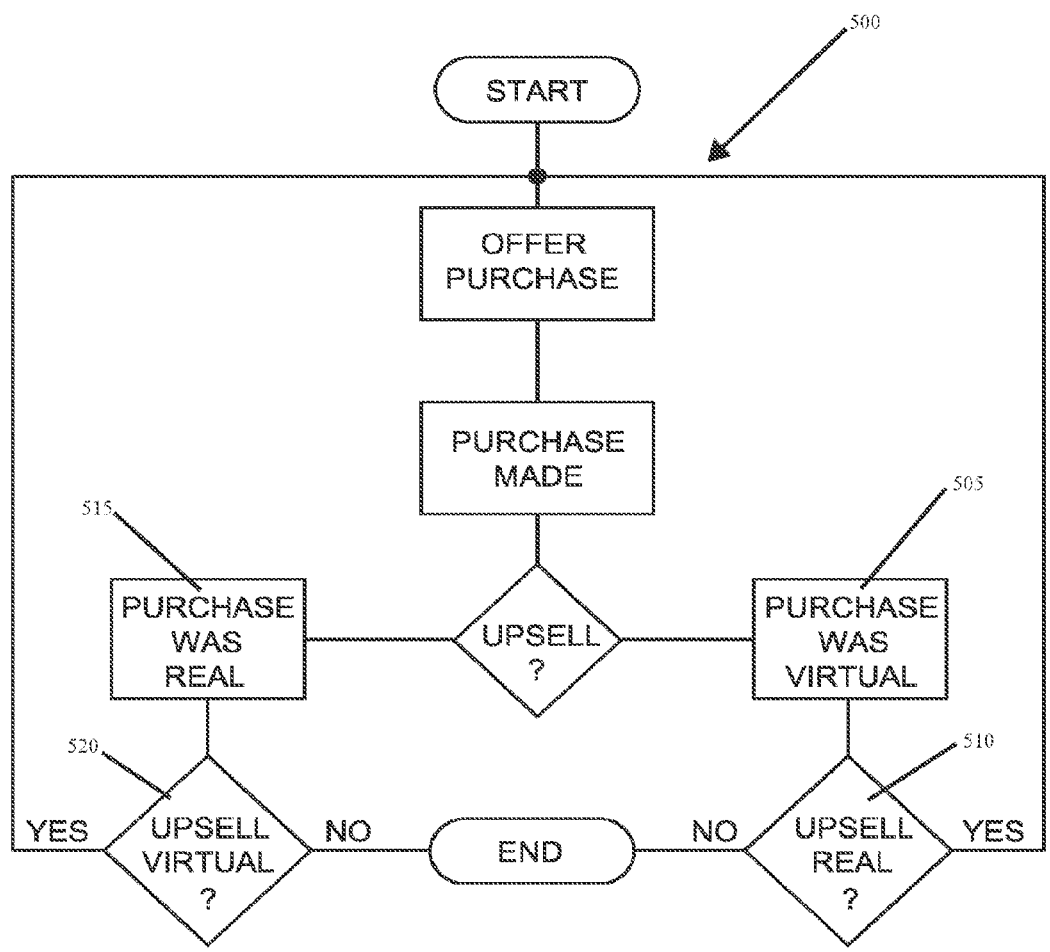
FIG. 5 illustrates a flow diagram in accordance with the present invention.

Additionally, the present invention may provide an upsell engine 500 as illustrated in FIG. 5. The upsell engine 500 may operate, upon purchase of a virtual item 505 for association with the user's avatar, may present the user with an opportunity to purchase the same or similar article in the real world 510 for real world use by the actual user based on that user's known preference for that article as evidenced by the purchase of the virtual article for use with the user's avatar. This may, of course, occur within an online store correspondent to the virtual store in which the avatar was "shopping." The upsell engine may additionally or alternatively include presentation to the user of an advertisement for real world articles that are the same as or associated with the virtual article purchased by the user, or may allow for presentation of advertising related to likely related virtual or real world articles of interest to the user based on the user's expressed preference for the particular virtual article selected. Needless to say, the present invention may also be used to upsell in the inverse situation—that is, the situation in which the user purchases a real world article 515 from a particular web site, or surfs a particular web site for real world goods and/or services, may cause the user to be presented with advertising for the purchase of the same or similar virtual articles, or associated or related virtual articles, or to be presented with a direct opportunity to purchase the same, similar, or related virtual articles 520 at the point of purchase of the particular real world article.

Further, the present invention may allow for association of particular levels of expertise with particular areas of interest as related to the avatar trading card. As such, the user associated with the subject avatar may take a rating of that user's expertise in certain areas from computing community to computing community. Thus, searches may be made available in one or more computing communities for persons having desired levels of expertise in certain areas. The user may thus accumulate expertise points in multiple computing communities at the same time, wherein such points may be associated with that user's transferable widgetized avatar, whereby a user's expertise may rise based on accumulated expertise points. Additionally and alternatively, a user's expertise in a certain area may increase based on feedback from other users in one or more computing communities in relation to the subject users expertise in a particular area, or a user's expertise may increase based on an assignment of expertise levels by one or more of the computing communities, or a user's expertise level may rise based on advice offered, amount of advice offered, or purchase of expertise or advice from that user in or more on-line computing communities. Thus, a search by a party in need, such as a key word search, for an expert in a particular area and may not return a user advertising to be an expert in a particular area, but instead may return a user adjudged to be an expert in a particular area by parties other than that user him or himself. Of course, in accordance with the present invention, such expertise levels may be associated with the avatar or avatar trading card, and as such may be subsequently transferred to other computing communities.

Thus, the avatar of the present invention enables a user to create a portable, fully virtual "person" for association with that user and carrying the characteristics of that user, including a personal profile and identification card that can be used in combination with any web page, webtop or desktop and any computing community, transaction or social networking situation. Thereby, the avatar of the present invention allows users to connect with other users and share ideas, content, expertise, and applications. Further, the avatar of the present invention thus assists in viral growth by offering users of certain or multiple computing communities an avatar that keeps all personal profile information in one transportable place. Additionally, the avatars of the present invention may provide a foundation for a recommendation and expertise engine employing an algorithm that may suggest content or an expert based on a user's community, popularity, known expertise, clicks, interests, searches, or the like.

Thus, the avatar of the present invention may include one or more of the user profile, physicality of avatar, user personal characteristics, user interests, user links, user photos, videos, or audio, user friends, user sayings, jokes, or the like, user notes, connections or message postings, and user clothing, accessories, activities and general style. As used herein, the computing communities and transactions to which the avatar of the present invention may be transferred include all computing communities, including telecommunications communities such as those accessible from cellular telephones, televisions, and the like.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A computer-based method of creating and using a portable and widgetized avatar, comprising:
    providing a networked server;
    wherein said networked server is comprised of a virtual shopping environment;
    wherein said virtual shopping environment is a virtual representation of a real world mall;
    providing a computer networked to said networked server;
    wherein said computer has a display;
    gathering a plurality of personal information from a user;
    creating an avatar on said computer, such that said avatar comprises a virtual likeness of a user based on said plurality of personal information;
    equipping said avatar with one or more accessories for the avatar;
    displaying said avatar on said display;
    wherein said avatar is portable and widgetized, such that said avatar may reside as a non-static content on at least two partially static web pages;
    wherein said avatar becomes portable after creation without a new creation process;
    wherein said virtual shopping environment is comprised of one or more virtual storefronts;
    wherein said avatar moves virtually through said one or more virtual storefronts;
    browsing by said avatar a plurality of items for sale in said one or more virtual storefronts;
    purchasing by said user at least one of said plurality of items;
    wherein said plurality of items presented for sale in said one or more virtual storefronts are related to said plurality of personal information of said user.

2. The method of claim 1, wherein said plurality of items are comprised of a plurality of virtualized articles of real world clothing.

3. The method of claim 2, wherein at least one of said plurality of virtualized articles of real world clothing comprises a designer brand.

4. The method of claim 1, wherein said plurality of personal information is comprised of:
    a user name;
    a screen name;
    a purchase tool;
    a handle;
    one or more personal characteristics;
    one or more user interests;

one or more user links;
one or more user photos;
one or more videos;
one or more user friends;
one or more user sayings;
one or more jokes;
one or more user notes;
one or more connections;
one or more message postings;
a user clothing;
one or more accessories;
one or more activities;
a user style;
one or more musical tastes of said user;
one or more motion picture tastes of said user;
a job status of said user;
an educational status of said user;
an age of said user;
a location of said user;
an income of said user;
a marital status of said user; and
one or more online communities with which said user is associated.

5. The method of claim 1, wherein said display of said avatar is two dimensional.

6. The method of claim 1, wherein said display of said avatar is three dimensional.

7. The method of claim 1, wherein said at least two unique and partially static web pages comprise HTML code.

8. The method of claim 1, wherein said avatar includes a plurality of facial features and hair.

9. The method of claim 1, wherein a display of said avatar comprises a trading card format.

10. The method of claim 9, wherein said trading comprises more than two sides.

11. The method of claim 9, wherein a flipped one of said more than two sides of the trading card includes is comprised of a plurality of personal information;
    wherein said plurality of personal information is comprised of: an age of said user, one or more interests of said user, one or more likes of said user, one or more dislikes of said user, and an employment status of said user.

12. The method of claim 1, wherein the plurality of personal information comprises an indication of an expertise in interacting with at least one computing community.

13. The method of claim 12, wherein the expertise is portable in conjunction with said avatar.

14. The method of claim 12, wherein the expertise is in accordance with a plurality of responses indicating helpfulness from other users in the at least one computing community.

* * * * *